Dec. 16, 1969  D. O. NASH  3,484,144
GAS TURBINE ENGINE BEARING ASSEMBLY
Original Filed Dec. 2, 1966
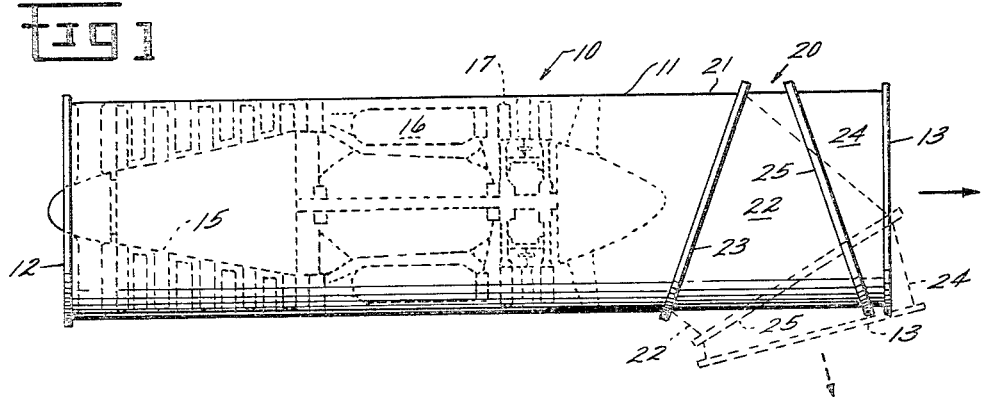
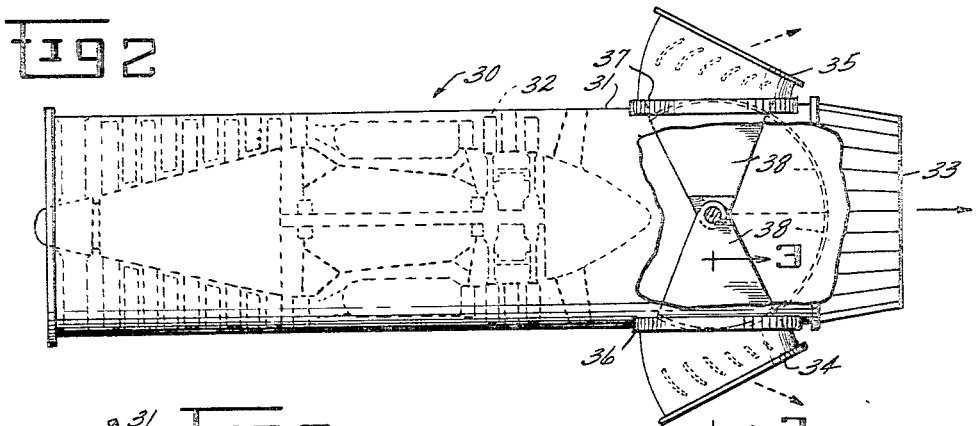
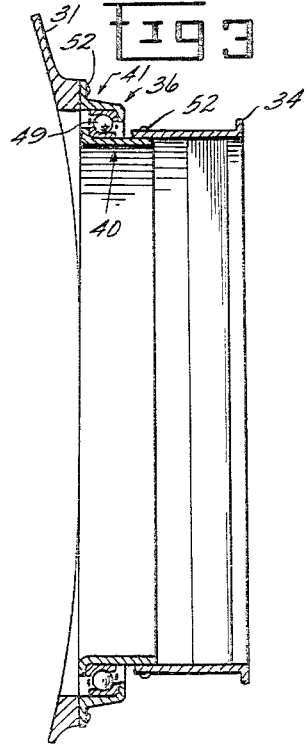
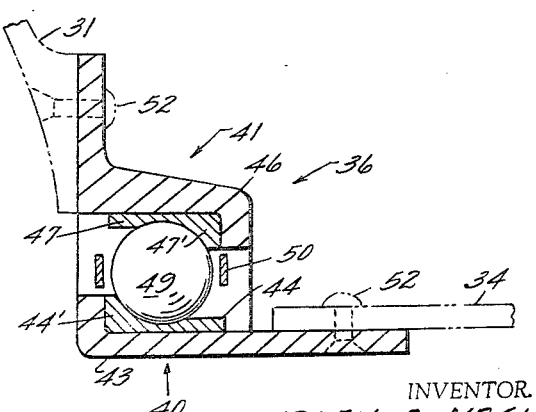
INVENTOR.
DUDLEY O. NASH
BY
George R. Powers
ATTORNEY—

United States Patent Office 3,484,144
Patented Dec. 16, 1969

3,484,144
GAS TURBINE ENGINE BEARING ASSEMBLY
Dudley O. Nash, Cincinnati, Ohio, assignor to General Electric Company, a corporation of New York
Continuation of application Ser. No. 598,709, Dec. 2, 1966. This application Sept. 19, 1968, Ser. No. 764,022
Int. Cl. F16c 35/00, 13/00, 33/00
U.S. Cl. 308—178
3 Claims

ABSTRACT OF THE DISCLOSURE

A large diameter bearing assembly which is extremely durable and operated under widely varying temperature conditions and particularly characterized by low weight and high rigidity without excessive bulk.

---

This application is a continuation of Ser. No. 598,709, filed Dec. 2, 1966, now abandoned.

This invention relates to large diameter bearing assemblies for use in gas turbine engines and other high temperature applications and, more particularly, to large diameter bearing assemblies that are extremely durable even when operated under widely varying temperature conditions. Still more particularly, this invention relates to large diameter bearing assemblies characterized by low weight and high rigidity without excessive bulk.

It is sometimes desirable to provide means for varying the direction of thrust produced by a jet propulsion engine. More particularly, it is often desirable to utilize thrust vectoring or flow directing means for diverting the jet stream of an aircraft gas turbine engine from its normal rearward direction relative to the aircraft to (1) a downward direction for producing vertical thrust, (2) a forward direction for producing reverse thrust, or (3) lateral directions for eliminating or reducing forward thrust. It is common in thrust vectoring systems to utilize large diameter rotating members such as segments of the engine exhaust duct or exhaust nozzles or cascades rotatably mounted on the exhaust duct. Generally speaking, such flow directing arrangements require two or more large diameter bearings between the members for permitting the relative rotation required for satisfactory operation. To maintain friction and, consequently, actuator power and weight at reasonable levels, it has been found that the large diameter bearings must be of the anti-friction type, i.e., ball or roller bearings. Furthermore, for acceptable operation and durability, the bearing races must be sufficiently rigid to hold race distortion under load within limits, and the bearing raceways, or rolling surfaces, and the rolling members must exhibit suitable hardness and wear resistance. To provide these various requirements, the general practice has been to form bearing assembiles entirely of steel. This approach has resulted, however, in bearing assemblies having considerable weight; this fact will be readily appreciated by recognizing that these large diameter bearings generally have a diameter of at least ten inches and sometimes considerably more. In typical thrust vectoring systems requiring a number of large diameter bearings, it has been found that the weight of bearings formed entirely of steel can amount to a very significant portion of the overall weight of the propulsion system. It is therefore very desirable that the bearing weight be reduced significantly, this being particularly true with respect to vertical take-off and landing propulsion systems requiring very high thrust to weight ratios. Efforts have, of course, been made in the past to reduce the weight of the large diameter bearings. Among other things, these efforts have included attempts to reduce weight by using lightweight materials in the bearing construction. However, this approach to the weight problem has not been entirely satisfactory since lightweight arrangements proposed heretofore have normally exhibited insufficient rigidity under load for satisfactory operation. In addition, composite bearing structures utilizing lightweight materials in conjunction with steel for raceway hardness and wear resistance have tended to provide inadequate service due to separation and failure of the elements comprising the composite structures. This separation problem has been found to increase in severity with increases in bearing size and range of operating temperatures. In other words, the use of lightweight materials for reducing the weight of large diameter bearings has been tried in the past and discarded under most conditions as being unworkable for the reasons discussed above.

It is an object of this invention to provide an improved large diameter bearing assembly for use in gas turbine engines and other high temperature machines.

It is also an object of this invention to provide an improved large diameter bearing assembly that is both lightweight and durable.

Yet another object of this invention is to provide a large diameter bearing assembly that is both lightweight and capable of sustained operation throughout a substantial range of operating temperatures.

A further object is to provide a large diameter bearing assembly that is characterized by low weight and high rigidity without excessive bulk.

A still further object of this invention is to provide an improved bearing assembly for use in thrust vectoring systems of aircraft gas turbine engines, the improved bearing assembly combining low weight and durability.

Briefly stated, in carrying out the invention in one form, a large diameter bearing assembly includes a pair of composite ring units each comprising an annular support member and an annular raceway secured to the support member. The ring units are positioned such that the raceways are juxtaposed, and anti-friction bearing means such as balls or rollers are disposed between the ring units in rolling engagement with the raceways so as to permit relative rotation between the ring units. The raceways and the anti-friction bearing means are formed of a material such as steel that is hard and wear resistant, and the support members are formed of a lightweight material having a high modulus of elasticity and a coefficient of thermal expansion that is substantially identical to that of the material comprising the raceways so as to prevent the creation of destructive thermal stresses within the composite structure during operation. By a further aspect of the invention, the support members are formed of beryllium and the raceways are formed of steel. A composite bearing structure formed of these materials is particularly suited for use in aircraft gas turbine applications, the bearing assembly displaying low weight, high rigidity, hardness and wear resistance, and resistance to element separation and failure due to thermal stresses caused by changes in operating temperature.

While the novel features of this invention are set forth with particularity in the appended claims, the invention, both as to organization and content, will be better understood and appreciated, along with other objects and features thereof, from the following detailed description when taken in conjunction with the drawing, in which:

FIG. 1 is an elevation view of an aircraft gas turbine engine in which the bearing assembly of this invention is utilized for providing relative rotation between large diameter segments of the exhaust duct in order to change the direction of thrust produced by the exhaust gases;

FIG. 2 is a plan view of an alternative thrust vectoring system also utilizing the large diameter bearing assembly of this invention;

FIG. 3 is a larger scale cross-sectional view of one of the bearing assemblies of FIG. 2, taken along viewing line 3—3 of FIG. 2; and FIG. 4 is a still larger cross-sectional view of a portion of the bearing assembly of FIG. 3.

Referring first to FIG. 1, an aircraft gas turbine engine 10 of the turbojet type is illustrated in elevation, the engine including a casing 11 of cylindrical form having an inlet 12 and an exhaust nozzle 13 at opposite ends thereof and, as shown by broken lines, an axial flow compressor 15, a combustor 16, and a turbine 17 disposed in serial flow relationship between the inlet 12 and the exhaust nozzle 13. To provide thrust vectoring capability, the casing 11 includes a segmented exhaust duct portion 20 for transmitting high energy and high temperature products of combustion from the turbine 17 to the exhaust nozzle 13. More particularly, the exhaust duct portion 20 includes a first conduit 21 having a fixed position relative to the turbine 17, a second conduit 22 rotatably secured to the first conduit 21 by a large diameter anti-friction bearing assembly 23, and a third conduit 24 rotatably secured the second conduit 22 by another large diameter anti-friction bearing assembly 25. By rotating the second and third conduits 22 and 24 relative to the first conduit 21 and to each other, the exhaust products may be discharged at widely varying directions of which two are illustrated. With the conduits 21, 22, and 24 positioned as shown by solid lines, the exhaust gases are discharged in a rearward direction such that forward thrust is exerted on the engine 10. To produce a substantial component of vertical thrust, the conduits 22 and 24 may be rotated to the positions shown by broken lines such that the exhaust gases are discharged with a substantial downward component.

FIG. 2 illustrates another thrust vectoring arrangement utilizing the improved bearing arrangement of this invention. As illustrated in plan view, a gas turbine engine 30 includes a cylindrical exhaust duct 31 extending downstream of the turbine 32 and terminating in an exhaust nozzle 33. Swivel-type nozzles 34 and 35 are provided on opposite sides of the duct 31, the nozzles 34 and 35 being rotatably secured to the duct 31 by bearing assemblies 36 and 37 identical in construction to the bearing assemblies of FIG. 1. Within the duct 31 are movable members 38 having first and second operative positions illustrated by solid and broken lines, respectively. In the first positions, the movable members 38 prevent flow through the nozzles 34 and 35 and permit flow through the exhaust nozzle 33 for producing forward thrust on the engine 30. In the second positions, the members 38 are positioned to permit flow of combustion gases through the nozzles 34 and 35 and to prevent flow through the exhaust nozzle 33. The nozzles 34 and 35 can be rotated relative to the fixed duct 31 through a full 360° arc to vary the direction of thrust produced on the engine 30 when the members 38 are in their second positions.

Since the exhaust ducts 20 and 31 of FIGS. 1 and 2 are typically of rather large diameter (ten inches or more as a general rule), it will be appreciated that the bearing assemblies 23, 25, 36 and 37 are also of substantial size and, if formed entirely of steel in accordance with state-of-the-art practice, weight. By the present invention, the bearing assemblies are composite structures having many of the physical characteristics heretofore available only in bearing assemblies formed entirely of steel, but not having the weight of steel. More particularly, the bearing assemblies 23, 25, 36 and 37 are rigid and compact and, in addition, provide a high degree of durability due in part to high wear resistance and in part to enhanced resistance to failure due to thermal stresses during operation.

The improved bearing construction of this invention will now be described with reference to FIGS. 3 and 4 wherein the bearing assembly 36 is illustrated in detail. The bearing assembly 36 includes an inner annular ring unit 40 and a coaxial outer ring unit 41 surrounding the inner ring unit 40 in closely spaced relation. The inner ring unit 40 is a composite member including an annular support member 43 of a lightweight material, preferably beryllium, and a relatively thin annular raceway 44 of hard bearing steel bonded to the outer surface of the support member 43. The outer ring unit 41 is similarly formed of a lightweight annular support member 46 and a thin annular raceway 47 in juxtaposed relation to the inner raceway 44. A plurality of steel balls 49 circumferentially mounted in a bearing cage or separator 50 are mounted between the ring units 40 and 41 in rolling engagement with both of the raceways 44 and 47 such that relative rotation can occur between the ring units 40 and 41. Contoured shoulders 44' and 47' on the raceways cooperate with the rolling balls 49 to maintain the ring units 40 and 41 in axial alignment against the thrust loads exerted on the nozzle 34 by exhaust gases passing therethrough. With the support member 43 secured to the nozzle 34 by suitable means such as rivets 52 or other means and the support member 46 similarly secured to the fixed duct or conduit 31, the bearing assembly 36 thus permits full 360° vectoring of the exhaust gases flowing through the nozzle 34.

In describing the bearing assembly 36, it has been pointed out that the support members 43 and 46 are preferably formed of beryllium and that the raceways 44 and 47 are preferably formed of hard and wear resistant bearing steel. These particular materials have been selected because of the unique properties they possess when joined in accordance with the present invention. First of all, the composite ring units 40 and 41 and, consequently, the entire bearing assembly 36 are relatively lightweight since beryllium is much lighter than steel. Of course, a lightweight construction could also be provided by forming the support members 43 and 46 of other lightweight materials, including aluminum, titanium, and magnesium; such an arrangement would not, however, provide rigidity, compactness and resistance to separation and failure due to thermal stresses. Beryllium is uniquely capable of providing these latter properties in combination with low weight since it has a modulus of elasticity that is approximately 47% greater than that of typical bearing steel and a coefficient of thermal expansion that is approximately the same as that of bearing steel. In other words, the support members 43 and 46 of beryllium weigh only about one quarter as much and are approximately 47% more rigid than steel members of the same dimensions, beryllium having a specific weight of 0.069 lb./in.$^3$ and a modulus of elasticity of $44 \times 10^6$ lb./in.$^2$ and typical bearing steel having a specific weight of 0.285 lb./in.$^3$ and a modulus of elasticity of $30 \times 10^6$ lb./in.$^2$. To provide the same rigidity as steel, the support members 43 and 46 could be reduced in size with still greater savings in weight. In addition, beryllium has a coefficient of thermal expansion, $6.5 \times 10^{-6}$ in./in.-° F., that is substantially the same as that of typical bearing steel, $6.8 \times 10^{-6}$ in./in.-° F. This means that the ring units 40 and 41 will expand and contract in response to temperature changes without generating large thermal stresses between the support members 43 and 46 and the respective raceways 44 and 47. As a result, the durability of the bearing assembly 36 is enhanced since the support members and the bearing raceways are unlikely to separate during operation, thereby destroying the structural integrity of the ring units.

Since the thermal stresses existing between the support members 43 and 46 and the respective raceways 44 and 47 are relatively low even when the range of operating temperatures is high, the ring units 40 and 41 may be joined by conventional techniques. As an example, the raceways may be mounted on the support members by light press fit sand secured thereto by a high temperature adhesive. The raceways 44 and 47 can then be ground to finished size. When machining the ring units 40 and 41, and particularly the beryllium support members 43 and 46, all applicable safety precautions should be observed since certain well-known dangers are associated with improper machining of beryllium.

It is thus seen that the improved bearing assembly of this invention is particularly suited for use in high temperature applications such as aircraft gas turbine engines since it is not only lightweight, but also rigid, compact, and durable in operation. The enhanced durability is provided in part by the wear resistance of the steel raceways and rolling members and in part by the lightly stressed condition of the unique ring units during operation.

It will be understood that the invention is not limited to the specific details of the construction and arrangement of the particular embodiment illustrated and described herein. In this respect, it will be appreciated that the invention is applicable to large diameter bearings in general and particularly to large diameter bearings used under varying temperature conditions. It will also be appreciated that the invention is also applicable to bearing arrangement in which the anti-friction bearing means comprises rollers rather than balls. It is therefore intended to cover all such changes and modifications which may occur to those skilled in the art without departing from the true spirit and scope of the invention.

What is claimed as new and desired to be secured by Letters Patent of the United States is:

1. A large diameter bearing assembly comprising:
   a first composite ring unit having an annular support member and an annular raceway secured to said support member to form an integral structure therewith,
   said raceway facing radially outward with respect to the axis of said first ring unit,
   a second composite ring unit coaxially surrounding said first ring unit,
   said second ring unit comprising an annular support member and an annular raceway secured to said support member to form an integral structure therewith,
   said raceway facing radially inward with respect to said axis of rotation in juxtaposed relationship to the raceway of said first ring unit,
   an anti-friction rolling means disposed between said first and second ring unit in rolling egagement with both of said raceways for permitting relative rotation,
   said raceways and said anti-friction rolling means being formed of a material having a high degree of hardness and wear resistance,
   said support members being formed of a lightweight material having a high modulus of elasticity such that substantial rigidity provided in a relatively lightweight and compact bearing assembly,
   the materials for forming said support members and said raceways being further characterized by substantially identical coefficients of thermal expansion,
   whereby the bearing assembly is extremely durable and capable of operating under all conditions without excessive thermal stresses.

2. A large diameter bearing assembly as defined by claim 1 in which said support members are formed of beryllium and said raceways and said anti-friction rolling means are formed of steel.

3. A large diameter bearing assembly comprising:
   a first composite ring unit having a diameter of at least ten inches,
   said first ring unit comprising an annular support member in an annular raceway secured to said support member to form an integral structure therewith,
   said raceway facing radially outward with respect to the axis of said first ring unit,
   a second composite ring unit coaxially surrounding said first ring unit,
   said second ring unit comprising an annular support member and an annular raceway secured to said support member to form an integral structure therewith,
   said raceway facing radially inward with respect to said common axis in a juxtaposed relationship to the raceway of said first ring unit,
   an anti-friction rolling means disposed between said first and second ring units in rolling engagement with both of said raceways for permitting relative rotation between said ring units about a common axis,
   said raceways and said anti-friction rolling means being formed of a material having a high degree of hardness and wear resistance,
   the materials for forming said support members and said raceways being further characterized by substantially identical coefficients of thermal expansion,
   and said support members being formed of a lightweight material having a high modulus of elasticity and a high stiffness to weight ratio and a high stiffness to volume ratio, in order to provide a relatively lightweight and compact bearing assembly.

References Cited
UNITED STATES PATENTS
3,081,135  3/1965  Olson _____ 308—195

MARTIN P. SCHWADRON, Primary Examiner

FRANK SUSKO, Assistant Examiner

U.S. Cl. X.R.
308—189, 195